United States Patent [19]

Grether

[11] Patent Number: 4,786,539

[45] Date of Patent: Nov. 22, 1988

[54] THERMAL INSULATING COMPOSITE LAMINATE

[75] Inventor: Paul Grether, Seuzach, Switzerland

[73] Assignee: Geilinger AG, Winterthur, Switzerland

[21] Appl. No.: 15,289

[22] Filed: Feb. 17, 1987

[30] Foreign Application Priority Data

Feb. 25, 1986 [EP] European Pat. Off. ........ 86810095-9

[51] Int. Cl.[4] .......................... B32B 1/04; B32B 3/00; L04C 3/30

[52] U.S. Cl. ........................................ 428/68; 428/71; 428/74; 428/76; 52/729; 52/731

[58] Field of Search ....................... 428/68, 71, 74, 76; 52/729, 731

[56] References Cited

U.S. PATENT DOCUMENTS 4,330,919 5/1982 Biuchlipp et al. .................... 52/731

4,455,800 6/1984 Hosooka et al. ...................... 52/731

FOREIGN PATENT DOCUMENTS 0162316 9/1983 Japan .................................... 428/76

*Primary Examiner*—John E. Kittle

*Assistant Examiner*—Patrick J. Ryan

*Attorney, Agent, or Firm*—Kenyon & Kenyon

[57] ABSTRACT

The composite laminate is made of two metal parts 1, 2 and a pair of thermal insulating bars of fiber reinforced synthetic material. Each metal part has a longitudinally extending groove which is provided with two rows of transversely disposed teeth which cut into the flanks of anchoring strips on the synthetic bars during pressing in of the strips in the respective grooves. The pressing in of the synthetic material into the teeth of the harder metal parts forms a strong bonded connection which resists the stresses imposed upon the laminate during use. Deformable tabs on the metal parts are used to ensure locking of the synthetic bars in place. The space required for production of the laminate is reduced essentially to the length of the metal parts.

14 Claims, 4 Drawing Sheets

THERMAL INSULATING COMPOSITE LAMINATE

This invention relates to a thermal insulating composite laminate particularly for windows, doors and facades.

Heretofore, various types of thermal composite laminates have been known, for example, for use in windows, doors and facades. By way of example, German No. C2-23 66 421 and EPA No. 01 23 110 describe a laminate in which two metal parts are spaced apart by a pair of bars or plates of synthetic material of low thermal conductivity. As described, each bar has a pair of longitudinally disposed anchoring strips which interlock with grooves in the respective metal parts. In addition, each groove is provided with a denticulated structure consisting of an embossed corrugation in the form of teeth which serves to improve the shearing strength of the connection between metal part and synthetic bar in an axial direction. The angled connection of the bars to the metal parts also serves to better absorb transverse stresses. In order to assemble the described laminate, the bars are slid into undercut grooves in a longitudinal direction and are fixed in place by having a flank of a metal part pressed onto the bars. The denticulated structure is then intended to push into the synthetic material which being partially compressed and partially displaced.

For reasons of strength, the thermal insulating bars have been more recently made of fiber reinforced synthetic material especially fiber glass reinforced polyamide. However, it has been found that embossing the denticulated structure into fiber reinforced synthetic material takes place to an insufficient extent so that the axial shearing strength is decreased in an undue way and is too unreliable. With the known laminate, an attempt has been made through the addition of supplementary elements (see, for instance, EP-A-00 85 410) with or without the aid of adhesives (EP-A-00 43 968) to achieve better mechanical locking and higher shearing strength. However, the additional processing steps for inserting the supplementary material and/or the adhesive agent and for the hardening of the bonded connections results in a laminate production process which is considerably more complicated and costly.

Furthermore, the synthetic bars must be inserted in a longitudinal direction in the metal parts and must be fixed by the pressing on of a groove flank since the connection between the metal parts and synthetic bars in customary laminates of this kind is achieved through mechanical locking in undercut grooves. Assembling such laminates thus requires a facility which is of a length twice that of the laminate. In this respect, as commercial laminates are approximately 6 meters, this requires assembly places of approximately 15 meters.

Accordingly, it is an object of the invention to improve the bond between metal components and fiber reinforced bars of composite laminates in which a high degree of strength and durability is demanded.

It is another object of the invention to simplify the production of laminates employing metal parts and synthetic parts.

It is another object of the invention to reduce the space required and the steps required to make a composite laminate for a window, door or facade.

Briefly, the invention provides a thermal insulating composite laminate which is comprised of a pair of metal parts disposed in parallel relation and a bar or panel of synthetic material of low thermal conductivity extending between the metal parts. Each metal part includes a longitudinally extending groove having a pair of parallel walls and a plurality of transverse teeth in each wall. The bar or panel includes a pair of angled anchoring strips each of which extends into a respective groove of a metal part. In addition, each anchoring strip has a plurality of teeth on each of two sides which are anchored in adhesive-free manner with the teeth on the walls of the groove.

The bar can be made of any suitable material such as a reinforced synthetic material, such as a fiber glass reinforced polyamide.

In order to further secure the bar in place, each metal part may have an integral longitudinally extending tab which is deformed over a respective strip of the bar.

The invention also provides a method of making a composite laminate. In this respect, the method includes the steps of forming a plurality of transverse teeth in at least one wall of a longitudinal groove of each of a pair of metal parts, of positioning the metal parts in spaced parallel relation in a common plane with the grooves disposed in perpendicular relation to the common plane, of positioning a synthetic material bar having a pair of longitudinally extending anchoring strips opposite the metal parts and pressing the strips into the grooves in a direction perpendicular to the plane of the middle parts in order to form corresponding teeth in the anchoring strips while anchoring the strips in the grooves in adhesive-free relation.

The teeth which are formed in the walls of the groove of each metal part are set perpendicular to the plane of reference defined by the longitudinal shear and transverse traction forces.

In order to facilitate production, the teeth may be formed in the metal parts by use of a hardened punch or reamer which is able to cut into the lateral flanks of the grooves. Subsequently, when the synthetic anchoring strips of the bar are pressed into the groove, the teeth perform, at least partially, a chip detaching step with the chips of synthetic material being removed from the adhesive-free connection being formed between the bar and metal parts.

This interlocking of the synthetic material with the metal parts guarantees a high strength connection along with a high shear capacity in an axial direction, Further, the absence of any undercutting for a mechanical locking connection permits a bond to be made between the metal parts and the synthetic bar by pressing in the direction perpendicular to the plane of the laminate defined by the longitudinal shear and transverse traction forces. Thus, insertion of the bars in a longitudinal direction of a laminate is not required. Thus, the space requirement for the assembly of the composite laminate is substantially reduced to the length of the laminate.

Pressing of the anchoring strips into the longitudinal grooves of the metal parts causes a slight spreading of the sides of the grooves aside from the deformation of the synthetic bar by chipping. This is due to the nature of the material which does not allow ideal cutting conditions between fiber reinforced synthetics and the metal parts which preferrably consist of aluminum alloy. This gives rise to an initial stress in the bond area which increases the security of locking by shape and force even with on-site large temperature differentials.

It is possible to arrange the grooves in fork-shaped angle flanks of the bars and to place the teeth inside flanks of corresponding anchoring strips of a metal part, i.e. to reverse the male and female part of the bonded connection. However, it is advantageous to form the groove and teeth in the metal part since the use of a groove in the synthetic bar would result in a loss of the initial stress over time due to the low temperature flow properties of the synthetic material. This, in turn, could ultimately damage the bonded connection.

The angled shape of the anchoring strips of the synthetic bar leads the transverse traction force eccentrically away from the bars. Accordingly, each groove of a metal part is also formed with a longitudinally extending recess while each anchoring strip has a longitudinally extending ridge which fits into the recess when the bar is pressed in place. The ridge thus permits the metal parts to grip the anchoring strips more tightly to prevent deformation of the synthetic bar.

In order to assemble the composite laminate, only two basic steps are required, i.e. cutting of the teeth in the metal part and the chip-producing pressing of the teeth into the synthetic material. In this respect, the two steps can be carried out simultaneously over the entire length of the laminate. Of note, the cutting and pressing strips which "dislocate" the synthetic material can be facilitated if the grooves have undercuts which adjoin the "inner" ends of the teeth and/or if the grooves and/or the strips have furrows at the back end of the teeth in the direction in which the strips are pressed in order to catch the chips peeled off from the synthetic material in the process of molding.

These and other objects and advantages of the invention will become more apparent from the following detailed description taken in conjunction with the accompanying drawings wherein.

Figure 3:
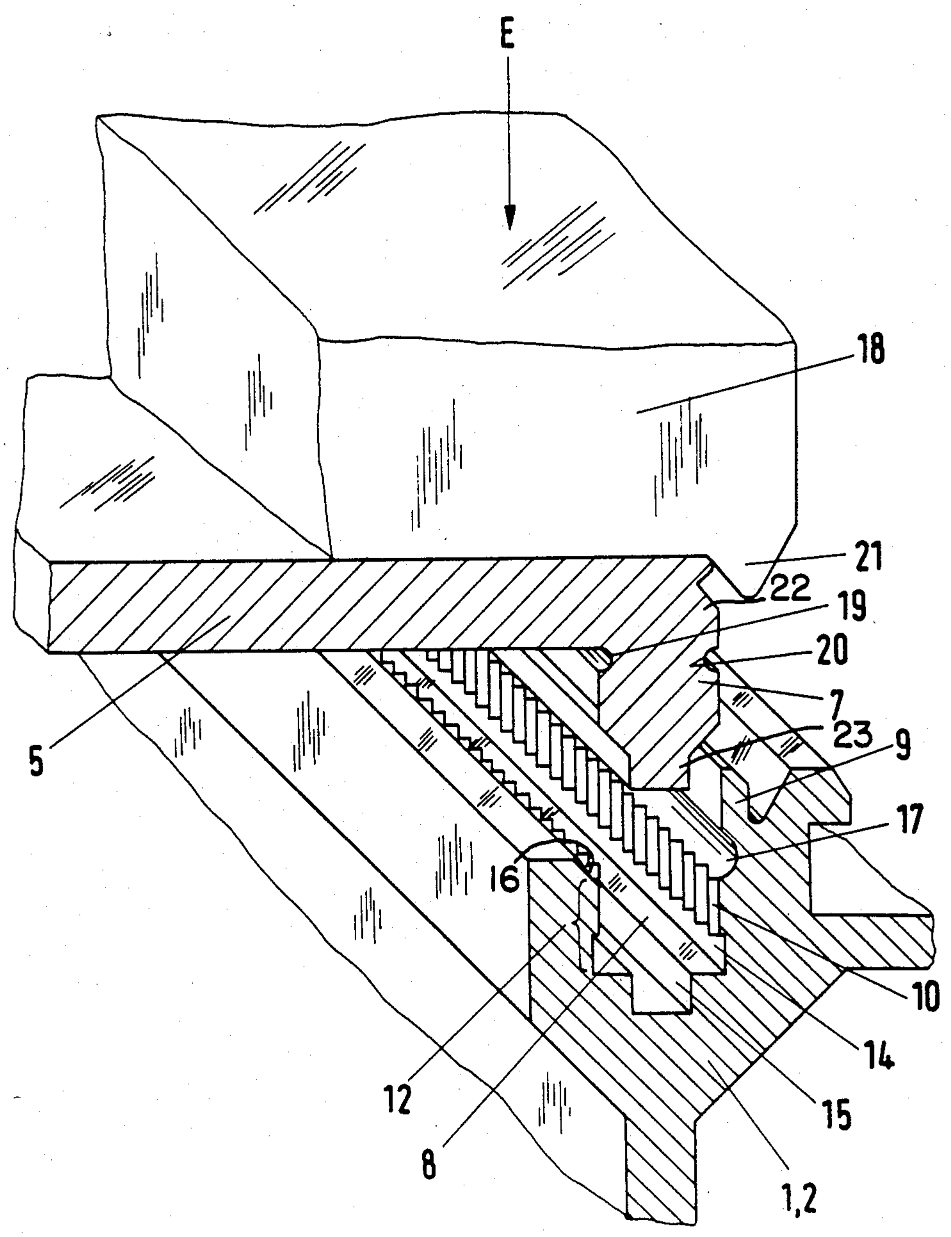
Figure 4:
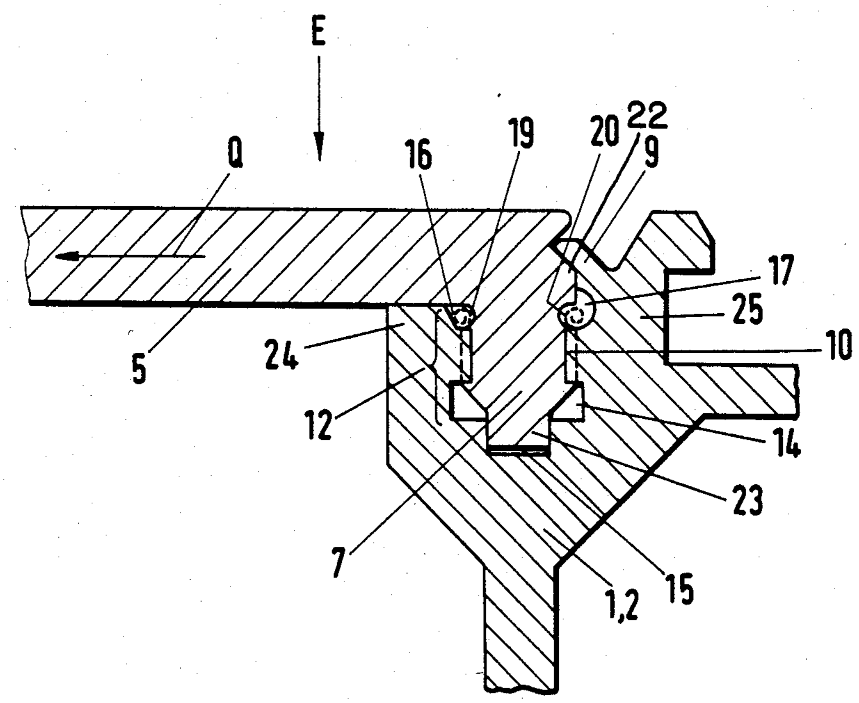

FIG. 3 schematically illustrates a view of a metal part and a synthetic bar during pressuring in of an anchoring strip of the bar in accordance with the invention; and FIG. 4 illustrates a bonded connection between a synthetic bar and a metal part of the composite laminate according to the invention.

Figure 1:
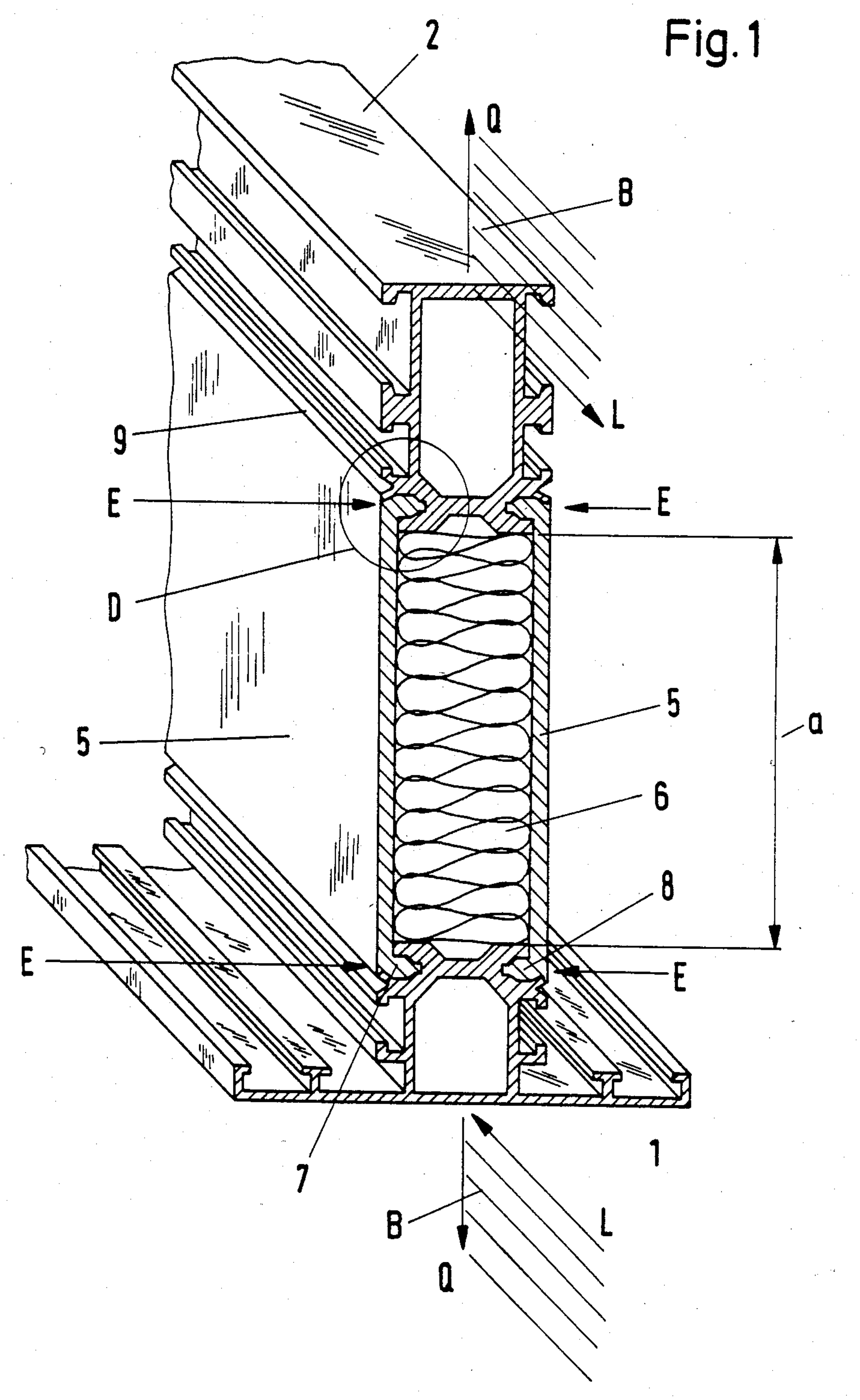
FIG. 1 illustrates a perspective cross-sectional view of a composite laminate constructed in accordance with the invention.

Referring to FIG. 1, the composite laminate may be used as a window frame mold and includes a pair of metal parts 1, 2, for example of aluminum in order to provide strength and a pair of plate-like bars or panels 5 of synthetic material extending in parallel spaced relation between the metal parts 1, 2. As indicated, the metal parts 1, 2 are disposed in parallel spaced relation in a distance a. In addition, the bars 5 are of a material of low thermal conductivity, for example, being made of a reinforced synthetic material such as a fiber glass reinforced polyamide. In addition, insulating material 6 which may be foamed or of mineral fiber is disposed between the bars 5.

As shown in FIG. 1, each bar 5 has a pair of angle shaped anchoring strips 7 which are pressed into grooves 8 of the metal parts 1, 2 in order to secure the bar 5 to the metal parts 1, 2. The anchoring strips 7 also serve to absorb transverse traction forces Q which become imposed on the composite laminate during use. In addition, longitudinal shearing forces L which are in a plane common to the traction force Q are also transferred from the bars 5 to the metal parts 1, 2 and vice versa in a bond area D. In particular, a great difference in thermal expansion must be expected in highly insulating metal-synthetic laminates where the distance between the metal parts 1, 2 is at least 40 millimeters as described in U.S. Pat. No. 4,563,843 because of the great temperature differential between the outer and inner laminate parts 1, 2. Likewise, a great longitudinal shearing stress is placed on the synthetic bars 5 and the bond zone D.

The minimum requirements placed on composite laminates of this kind with respect to the necessary resistance against transverse traction Q are, for instance, contained in the "Richtlinien für den Nachweis der Standsicherheit von Metall-Kunststoff-Verbundprofilen" (Guidelines for Evidence of the Stability of Metal-synthetics Laminates) of the Institut fur Bautechnik, Berlin. They are for the transverse traction Q=20N/mm laminate length at a temperature of 80° C.

The direction of the two forces L and Q define the plane of reference B which lies parallel to the plane of the bars 5.

Figure 2:
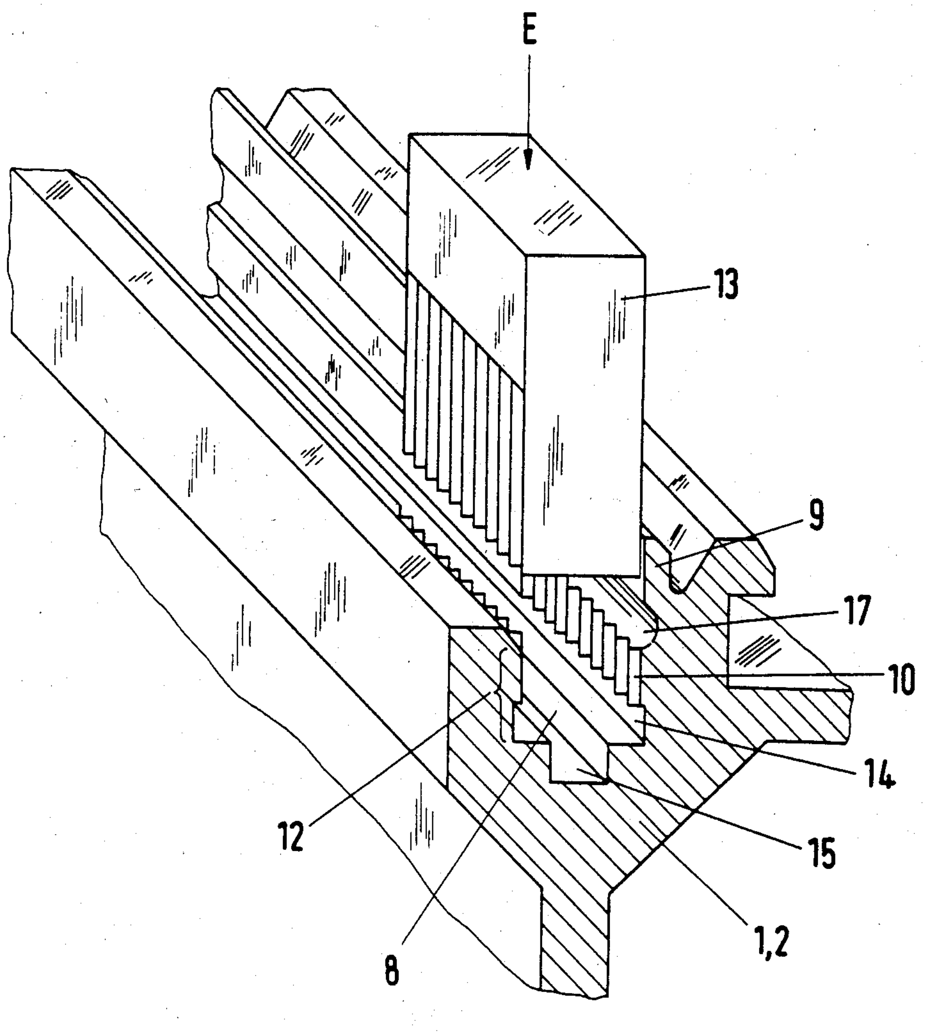
FIG. 2 illustrates a three-dimensional representation of a metal part during cutting in of the teeth in the walls of a groove therein.

Referring to FIG. 2, each metal part 1, 2 is made with a groove 8 which extends longitudinally along the length of the part. Also, each groove 8 has a pair of side flanks 12, a pair of undercuts 14 and a longitudinally extending recess 15. A pair of longitudinal furrows 16, 17 (FIG. 4) are also provided at the mouth of each groove 8 while a tab 9 extends outwardly from one furrow 17.

Each flank 12 is also provided with a plurality of parallel teeth 10 which are disposed transversely to the groove 8. As indicated, each row of teeth 10 is disposed between an undercut 14 and a furrow 16, 17.

In order to form the teeth 10 a hardened punch 13, for example of steel, having oppositely toothed surfaces is punched into the groove 8 in a transverse direction E to cut the teeth 10 into the flanks 12. As indicated in FIG. 2, the punch 13 is of a lesser extent in the longitudinal direction than the groove 8 so that a sequence of punch steps are required in order to form the two rows of teeth 10.

Referring to FIG. 3, each anchoring strip 7 of a panel 5 is initially made with a pair of smooth side walls and a longitudinally extending ridge 23 which is sized to slidably fit into the recess 15 of a groove 8.

In order to form a bonded connection between an anchoring strip 7 and a groove 8, the anchoring strip 7 is pressed into the teeth 10 of a groove 8 by a press 18 in the direction E. The teeth 10 in the harder metal parts 1, 2 thus cut corresponding counter-teeth into the side flanks of the strip 7 with the chipped off chips being caught and held in the furrows 16, 17 of the metal part. In this respect, additional furrows 19, 20 may be formed in the synthetic bar 5 at the foot of the anchoring strip 7 to catch these chips. Toward the end of the pressing step, a projection 21 on the outside of the press 18 bends the tab 9 of a metal part 1, 2 in the direction of the bar 5 so that the tab 9 is deformed over a shoulder 22 on the outer surface of the bar 5. As indicated in FIG. 4, the tab 9 serves to further lock the anchoring strip 7 in the groove 8.

As also indicated in FIG. 4, after the anchoring strip 7 has been pressed into place, the ridge 23 is positioned within the recess 15 so as to absorb any moment created by the eccentric action of the transverse traction force Q in the strip 7. The ridge 23 and recess 15 thus prevent an unacceptable deformation of the synthetic material due to the eccentric action of the traction force Q.

In order to assemble the composite laminate shown in FIG. 1, each metal part is provided with the transverse teeth 10 in at least one wall or flank 12. Thereafter, the parts are positioned in spaced parallel relation in a common plane with the groove 8 disposed in perpendicular relation to this plane. Next, the synthetic material bar 5 is positioned opposite the metal parts with the anchoring strips 7 aligned with the respective grooves 8 as indicated in FIG. 3. Next, the press 18 is used to press the anchoring strips 7 of the bar 5 into the respective grooves 8 in the direction E in order to form the teeth in the anchoring strips by the above-noted chip-molding manner so as to anchor the strips 7 in the grooves 8 in adhesive-free relation.

Of note, the two synthetic bars 5 can be pressed in all four bond areas D (see FIG. 1) over the entire laminate length simultaneously with a suitably equipped press.

Because of the non-ideal cutting conditions due to the nature of the material between the strips 7 and the metal parts 1, 2, a slight spreading of the sides 24, 25, of each groove 8 (see FIG. 4) takes place during the chip producing deformation of the synthetic material strips 7. However, the resulting initial stress in the bond area D guarantees a secure mechanical and frictional locking relationship even under great temperature fluctuations when in use.

As further indicated in FIG. 4, the "inner" ends of the teeth 10 adjoin the undercuts 14 in the groove 8. This permits, on the one hand, the tearing off of the metal chips by the punch 13 in order to form the teeth 10, and on the other hand, stores these metal chips until they can be removed, for example by being blown out.

Further, as indicated in FIGS. 1 and 4, the tabs 9 which are deformed over the synthetic bars 5 prevent a lateral sliding of the strips 7 out of the grooves 8. When in use, the tabs 9 are not subjected to any stress.

As previously noted, the arrangement of the grooves and strips may be reversed so that the anchoring strip is located on a metal parts 1, 2 while the grooves are provided on the synthetic bar 5. However, this has certain disadvantages because of the low temperature flow of the synthetic material.

The invention thus provides a composite laminate which can be constructed in a relatively simple manner within a minimum of space.

The invention also provides a composite laminate of relatively simple construction in which a synthetic bar can be secured to a metal part with a high strength connection.

Further, the invention permits the use of composite laminates wherein the synthetic bar has a height a, i.e. a lowest distance between the metal parts 1, 2 (see FIG. 1) which is from five to eight times the height of such bars in composite laminates used up to now; nevertheless the laminates according to the invention are able - due to a high degree of strength and durability - to compensate for the greater shearing stresses imposed by the greater temperature differentials on such laminates.

What is claimed is:

1. A thermal insulating composite laminate comprising a pair of metal parts disposed in parallel spaced relation in a common plane, each said part including a longitudinally extending groove having a pair of parallel walls and a plurality of transverse teeth in each said wall perpendicular to said plane; and a bar of synthetic material of low thermal conductivity extending between said metal parts and having a pair of angled anchoring strips, each said strip extending into said groove of a respective metal part and having a plurality of teeth on each of two sides perpendicular to said plane and anchored in adhesive-free manner with said teeth on said walls of said groove.

2. A thermal insulating composite laminate as set forth in claim 1 wherein said bar is made of a reinforced synthetic material.

3. A thermal insulating composite laminate as set forth in claim 2 wherein said material is a fiber glass reinforced polyamide.

4. A thermal insulating composite laminate as set forth in claim 1 wherein each metal part has an integral longitudinally extending tab deformed over a respective strip of said bar.

5. A thermal insulating composite laminate as set forth in claim 1 wherein each groove includes a longitudinally extending recess and each strip has a longitudinally extending ridge fitted into a respective recess.

6. A thermal insulating composite laminate as set forth in claim 1 wherein each groove includes an undercut between said teeth on at least one wall and a base of said groove.

7. A thermal insulating composite laminate as set forth in claim 1 wherein each groove includes a longitudinally extending furrow adjacent said teeth on at least one wall.

8. A thermal insulating composite laminate comprising a pair of metal parts disposed in parallel spaced relation, each said part including a longitudinally extending groove on each of two opposite sides having a pair of parallel walls with a plurality of transversely disposed teeth on at least one wall; and a pair of bars of synthetic material of low thermal conductivity extending in parallel spaced relation between said metal parts, each said bar having a pair of anchoring strips extending perpendicularly from opposite longitudinal edges thereof, each strip extending into a groove of a respective metal part and having a plurality of transverse teeth on at least one side anchored in adhesive-free manner with said teeth on said wall of said respective groove.

9. A laminate as set forth in claim 8 wherein each groove includes a longitudinally extending recess and each strip has a longitudinally extending ridge fitted into a respective recess.

10. A laminate as set forth in claim 9 wherein each metal part has an integral longitudinally extending tab deformed over a respective strip of said bar.

11. A laminate as set forth in claim 8 which further comprises a layer of insulating material between said bars.

12. A method of making a composite laminate which comprises the steps of forming a plurality of transverse teeth in at least one wall of a longitudinal groove of each of a pair of metal parts;

positioning the metal parts in spaced parallel relation in a common plane with the grooves disposed in perpendicular relation to said plane;

positioning a synthetic material bar having a pair of longitudinally extending anchoring strips opposite said metal parts; and pressing said strips of said bar into said grooves in a direction perpendicular to said plane to form corresponding teeth in said strips while anchoring said strips in said grooves in adhesive free relation.

13. A method as set forth in claim 12 wherein said forming step includes cutting of said teeth with a hardened punch.

14. A method as set forth in claim 12 wherein said forming step and said pressing step are performed over the entire length of the metal parts simultaneously.

* * * * *

UNITED STATES PATENT AND TRADEMARK OFFICE

CERTIFICATE OF CORRECTION

PATENT NO. : 4,786,539

DATED : Nov. 22, 1988

INVENTOR(S) : PAUL GRETHER

It is certified that error appears in the above-identified patent and that said Letters Patent is hereby corrected as shown below:

Column 1, line 28 "which" should be - while-

Column 3, line 42 "pressuring" should be -pressing-

Signed and Sealed this

Fourth Day of July, 1989

*Attest:*

DONALD J. QUIGG

*Attesting Officer*

*Commissioner of Patents and Trademarks*